United States Patent [19] | [11] 4,242,366

Morgan et al. | [45] Dec. 30, 1980

[54] EMULSIFIER SYSTEM AND CAKE MIX CONTAINING SAME

[75] Inventors: Jay E. Morgan, Eden Prairie; Anthony J. DelVecchio, Minneapolis; Betty L. Brooking, Golden Valley; David M. Laverty, Plymouth, all of Minn.

[73] Assignee: The Pillsbury Company, Minneapolis, Minn.

[21] Appl. No.: 954,145

[22] Filed: Oct. 24, 1978

[51] Int. Cl.³ ........................ A21D 2/16; A21D 10/00

[52] U.S. Cl. .................................... 426/554; 426/611; 426/653; 426/654

[58] Field of Search ................. 426/24, 552, 553, 554, 426/611, 653, 654; 252/356

[56] References Cited

U.S. PATENT DOCUMENTS

| | | | |
|---|---|---|---|
| 3,158,487 | 11/1964 | Reid | 426/654 |
| 3,248,229 | 4/1966 | Pader et al. | 426/653 |
| 3,494,771 | 2/1970 | Thompson | 426/653 |
| 3,622,345 | 11/1971 | Gupta | 426/654 |

*Primary Examiner*—Raymond N. Jones
*Assistant Examiner*—Elizabeth A. Hatcher
*Attorney, Agent, or Firm*—Mart C. Matthews; Michael D. Ellwein

[57] ABSTRACT

A blend of commercial grade emulsifiers suitable for use in a dry prepared mix, dry prepared cake mixes containing such blend and processes for preparing same are described and claimed. The blend comprises an admixture of three separate functional emulsifying components consisting essentially of 46–68% propylene glycol monoester, 20–39% alpha monoglyceride and 9–22% glyceryl lacto ester.

13 Claims, No Drawings

EMULSIFIER SYSTEM AND CAKE MIX CONTAINING SAME

FIELD OF THE INVENTION

This invention relates to an emulsifier system comprising a combination of fatty acid monoesters of polyhyric alcohols and particularly to an improved emulsifier blend which is useful alone or in combination with shortening in dry culinary mixes such as prepared cake mixes.

DESCRIPTION OF THE PRIOR ART

Hydroxylated fatty compounds, such as partial fatty acid esters of polyhyric alcohols, have been widely used in the food industry as emulsifiers in baked goods, as complexing agents for starch containing products, as additives for ice cream and other frozen desserts and as aerating components of whipped toppings and icings. These compounds have been particularly useful in various dry prepared culinary mixes.

Cake mixes in dry form are very familiar commercial products. Such cake mixes usually comprise flour, sugar, shortening, emulsifier (either separately or incorporated into the shortening), leavening, flavors and other additives. To prepare a cake batter from these mixes, liquid ingredients such as water, milk, eggs, etc., are added and the combination is beaten to form an aerated homogenous mixture which is subsequently baked to produce the cake.

Because of the unique manner in which cake batters are prepared using these mixes, the success that they now enjoy in large part has been dependent upon the development of emulsifier systems specifically adapted to this use. In general, these emulsifiers must exhibit good emulsification properties so that sufficient liquids can be incorporated into the cake to give a moist eating quality and must also have sufficient aeration action to permit the cake batter to incorporate and hold the necessary amount of air with a minimum of beating. A considerable number of different emulsifiers have been approved and used in cake mixes and shortenings intended for cake mixes, and frequently it is observed that a multi-component emulsifier system provides better results than any single emulsifier. Among the most frequently used cake mix emulsifiers are the various partial fatty acid mono- and diesters of glycerin (commonly referred to as mono- and diglycerides), propylene glycol monoester, glyceryl lacto ester, lactylated propylene glycol monoester, lecithin, sorbitan monostearate and polyoxyethylene sorbitan monostearate, either alone or in combination with one another. These prior art emulsifiers and combinations thereof appear to meet the basic criteria for acceptable use in layer cake mixes, yet they exhibit certain deficiencies. Therefore, considerable effort has been undertaken in the art to develop alternatives to these emulsifiers which overcome the deficiencies of the prior art and optimize the finished product in terms of desirable attributes, such as stability, fine grain structure, appearance, moistness, tenderness, texture, flavor, rate of disappearance in the mouth, water-holding capability, etc. The present invention is directed toward this end.

SUMMARY OF THE INVENTION

In accordance with the present invention, a novel three-component emulsifier system is provided which is particularly useful in food mixes wherein a combination of good emulsification and aeration properties are required. This emulsifier system comprises a specific blend of commercially available food emulsifiers, the functional emulsifier components of which consist essentially of (on a weight basis) 45–68% propylene glycol monoester, 20–39% alpha monoglyceride; and 9–22% glyceryl lacto ester. The blend may be prepared by mixing together commercially available food grade emulsifiers containing the above components in amounts sufficient to fall within the indicated ranges.

It has been found that the emulsifier blend of the present invention provides significant improvements in the moistness and water-holding capability of cakes baked from dry mixes while providing a tender texture and fine even grain structure and excellent eating quality to the cake. The emulsifier blend is preferably incorporated in the cake mix at 2 to 7% fo the weight of the total dry ingredients in the mix. The improved results obtained with the emulsifier blend of the invention are not achievable with any of the individual components alone or with two-component systems using the same or similar emulsifiers, and these results appear to be dependent upon a synergistic effect among the components. The components of the emulsifier blend may be incorporated directly into the cake as individual ingredients or the components may be combined prior to incorporation into a cake mix, or a shortening used therein. The effectiveness of the emulsifier blend is not dependent upon the type of process used to produce the cake mix, and advantageous results may be achieved by utilizing the blend in conventionally prepared cake mixes, those that utilize a spray-dried premix of flour, sugar and emulsifier, high ratio cake mixes, etc.

DETAILED DESCRIPTION OF THE PREFERRED EMBODIMENT

As stated previously, the emulsifier blend of the present invention comprises a combination of food-grade emulsifiers wherein the functional emulsifying components thereof consist essentially of three partial fatty acid esters of polyhyric alcohol in predetermined amounts, i.e., 45–68% propylene glycol monoester (hereinafter sometimes referred to by the abbreviation "PGME"), 20–39% alpha monoglyceride (hereinafter sometimes referred to by the abbreviation "MONO") and 9–22% glyceryl lacto ester (hereinafter sometimes referred to by the abbreviation "GLE"). All percentage figures expressed herein are percentages based on weight, unless expressly indicated otherwise. The term "emulsifier blend" is used herein to designate the crude mixture of commercial emulsifiers whereas the term "component" refers to the pure chemical compound.

Emulsifier blends of the present invention are conveniently prepared by mixing together readily-available commercial food grade emulsifiers in proportions which give the specified amounts of emulsifier components in the blend. Food grade emulsifiers are well-known to those skilled in the manufacture of food products and usually comprise very complex and heterogeneous chemical mixtures which do not generally approach purity. Along with the main functional emulsifier ingredient by which the emulsifier is identified, there are varying amounts of unreacted starting material as well as by-products of the esterification reactions employed to form the emulsifier. It has been found that these impurities, however, do not have a significant effect on the performance of the emulsifier blend of the present invention, and can be essentially disregarded unless they comprise one of the emulsifier components of the blend. If one component in the blend, e.g., MONO, occurs as an impurity in a commercial emulsifier serving as the source of another component in the blend, e.g., PGME, this additional amount must be included when the total amount of that first component in the blend is determined.

The PGME component in the emulsifier blend is preferably supplied by a commercially available food grade emulsifier containing from about 30-60% PGME, most preferably 50-60% PGME. These emulsifiers may be prepared by reacting dihydric alcohols with higher fatty acids, or fats containing fatty acids. One of the following specific procedures is generally employed: the methylation of fats and the subsequent reaction of the methyl esters with glycol; or the direct esterification of glycol and fatty acids. The aforementioned esterification usually forms, firstly monoesters, each containing one hydroxyl and one fatty acid radical, and secondly, diesters with both hydroxyls being substituted with the fatty acid radicals. The monoesters constitute the component desired in the emulsifier blend of this invention; however, the usual mixture of about 60-90% monoester and the balance of diesters is satisfactory. The fatty acid reactant is preferably saturated and has a chain length of from 12 to 22 carbon atoms, preferably palmitic or stearic acid, or admixtures thereof. Specific partial esters which are suitable for the invention are propylene glycol mono stearate, propylene glycol monopalmitate, propylene glycol monolaurate, etc., alone or in combination with the comparable diesters and each other. In addition to the PGME component, these commercial emulsifiers may also contain varying amounts of the MONO component of the emulsifier blend, as well as diglyceride, triglyceride, and free fatty acid, the latter of which may be considered nonfunctional with regard to the present invention. Particularly useful in the practice of the present invention are the food-grade emulsifiers sold by Durkee Foods Division of SCM Corporation under the trademarks Durpro 107, Durpro 187 and EC-25. Durpro 187 is a preferred emulsifier and comprises from 50 to 60% PGME and 10-15% MONO. It has a capillary melting point of 117°-125° F. and a hydrophiliclipophilic balance (HLB) value of 2.5.

The MONO component of the emulsifier blend is preferably supplied by a commercially-available food-grade, mono-diglyceride emulsifier. This emulsifier may be prepared by known procedures involving the reaction of glycerin with certain fats, oils or fatty acids and is usually available as the crude reaction product which also comprises diglyceride, triglyceride, glycerin and free fatty acid. Commercial monoglyceride emulsifiers are also available in a relatively pure distilled form. Both alpha and beta isomers of monoglyceride are included in varying amounts, depending on whether the esterification occurs at the terminal or center carbon atom of the glycerin, but these isomers equilibrate by acyl migration upon storage to result in about 88% alpha monoglyceride. As examples of food-grade emulsifiers which have been found to be particularly useful as the source of the MONO component in the emulsifier blend of the invention, mention may be made of the Dur-Em emulsifiers available from Durkee Foods Division of SCM Corporation, and the Myverol emulsifiers available from Eastman Kodak Company. Dur-Em 104 is a preferred emulsifier and comprises at least 40% alpha monoglyceride and no more than 1% free fatty acid and 1% free glycerin. This emulsifier has a capillary melting point of 115°-121° F. and an HLB value of 65-70.

The GLE component of the emulsifier blend is preferably supplied by a food-grade glyceryl lacto ester emulsifier which may be prepared by known procedures involving the reaction of a mono- and diglyceride concentrate with lactic acid. The lactopalmitates are preferred but the lactostearates are also satisfactory and may be used alone or in admixture with the lactopalmitates. These commercial emulsifiers usually have all the aforementioned impurities of the mono-diglyceride emulsifier plus the additional lactic acid moiety combinations. Lactic acid has both a hydroxyl and carboxyl group in its molecule and readily forms a condensation polymer with an adjoining lactic acid. The commercial glyceryl lacto ester emulsifiers therefore contain variable amounts of polymerized lactic acid of variable chain lengths. Commercial emulsifiers which have been found to be particularly useful in the present invention are those available from Durkee Foods Division of SCM Corporation under the trademark Durlac, particularly Durlac 200, which has at least 24% water-insoluble combined lactic acid (WICLA) and no more than 7% alpha monoglyceride and 10% free fatty acid. This emulsifier has a capillary melting point of 97°-103° F., a saponification number of 290-305 and an iodine value no greater than 10.

The actual quantities of each functional component in emulsifier blends of the present invention may be calculated from the proportion of that component in the commercial emulsifier or readily determined by analytical techniques known in the art. For example, the actual quantity of PGME in the blend may be determined analytically by treating the blend with trimethyl silyl ether to convert the hydroxyl groups present in the molecules and render the PGME component volatile. This volatile component is then separated and measured using a gas chromatograph with hydrogen-flame detector. A suitable method for determining the amount of MONO component in the blend is based on Method CD-11-57, Section II, of the Methods of the American Oil Chemists Society. In principle, this method involves dissolving weighed samples in chloroform and extracting with water any free glycerin present. Aliquots of the solution are oxidized with an excess of periodic acid and the quantity of periodic acid destroyed in this oxidation is proportional to the alpha monoglyceride present. The amount of the GLE component may be determined by measuring the amount of water insoluble combined lactic acid (WICLA), i.e., the chemically bound lactic acid. In this determination, the uncombined lactic acid is first washed out of the sample with a 5% acetic acid solution. The remaining lactylated fat is saponified and then acidified to form free acids (fatty acids plus lactic acid). The lactic acid is then extracted into water, strongly acidified and reacted with p-phenyl phenol to produce a blue color. The amount of lactic acid present is proportional to the color intensity, which is measured spectrophotometrically with a standard curve. The WICLA value indicates the amount of GLE in the sample. An alternative, and possibly more accurate and rapid check of whether the proper amount of GLE is present in the emulsifier blend is to measure the saponification number of the blend before and after the addition of the GLE component. The saponification number represents the milligrams of potassium hydroxide which are required to saponify one gram of the emulsifier blend. The GLE has a characteristically high value (e.g., about 290–320). Preferably, the saponification number of the emulsifier blends of the invention range from 205 to 225 with the GLE component present and from 156 to 180 without the GLE component.

Certain additional analytical determinations commonly used to characterize food-grade emulsifiers may be performed on the emulsifier blend to assure proper composition in accordance with this invention. For example, emulsifier blends of this invention preferably have a free fatty acid content of 6% or below, a capillary melting point of 41°–43° C. and an iodine value of 13–18. As previously indicated, the blend also preferably has a saponification number of 205–225.

It is contemplated that the emulsifier blend of the invention would find application in a variety of products, particularly in food products which require emulsifiers which combine good emulsification properties and the ability to incorporate and retain air. As previously indicated, the use of the emulsifier blends in the preparation of various baked goods, e.g., bread, doughnuts, pastries, etc., is of particular interest, especially those prepared from the appropriate dry culinary mix. The utility of these emulsifier blends has proven to be the most advantageous in the preparation of layer cakes from dry mixes wherein the blends have exhibited a unique ability to impart moistness to the resultant cake while retaining a fine grain texture and delicate eating texture. Although the detailed discussion which follows is limited to such cake mixes, there is no intent to limit the invention to such applications.

Methods of preparing dry prepared mixes for layer cakes are disclosed and known in the art, and the present invention is not limited to any particular method of preparation. Conventional cake mixes may be prepared, for example, by first melting the shortening and emulsifier together at an elevated temperature and then blending sugar with the melted mixture. Flour is combined and blended with the balance of the dry ingredients, such as leavening ingredients, flavoring, etc., and this mixture is combined with the shortening, emulsifier and sugar mixture, for example, in a paddle mixer. The blended mixture may then be passed through a finishing machine or entoleter to form a homogeneous, free-flowing mix. Many times the flour, sugar, and shortening and/or emulsifier are first combined and processed to form a pre-mix which is subsequently added to a base mix comprising the remaining dry ingredients to form the final cake mix. This type of cake mix is described, for example, in U.S. Pat. Nos. 2,874,051-03, U.S. Pat. No. 3,508,929 and others.

The emulsifier blend of the invention is particularly useful in cake mixes which utilize a spray-dried premix of flour, sugar and emulsifier, as described in U.S. Pat. No. 3,505,079. These cake mixes may be prepared with little or no shortening, and yield layer cakes with excellent moistness, structure and texture. The absence of shortening is desirable in low calorie cakes since the shortening is a major source of calories.

Excellent results have also been obtained by using the emulsifier blends of the invention in the preparation of what is known as "high-ratio" cakes. These currently popular cakes are characterized by sugar contents which are about 115% to 145% of the flour weight, and are required to carry increased amounts of sugar and liquids over conventional cake formulations. The emulsifier blends of the invention not only allow the incorporation and retention of sufficient liquids which are essential to good quality in these cakes, but also provide the smooth crust surface, freedom from gumminess, and fine delicate cell network that are so desirable in such layer cakes.

The flour ingredient can be the usual soft cake flour, preferably containing at least 50% by weight wheat flour. The sugar ingredient can be any of the commonly used granular or powdered sugars such as sucrose, dextrose, maltose, fructose, lactose, and brown and invert sugars, including mixtures thereof. Most preferred are sucrose and dextrose, alone or in combination. The leavening soda ingredient can be any of those commonly used such as, for example, sodium, potassium, or ammonium bicarbonate. Suitable leavening acids include, for example, monocalcium phosphate, dicalcium phosphate, sodium acid pyrophosphate, potassium acid tartrate, monosodium phosphate, sodium aluminum phosphate and sodium aluminum sulfate. Shortenings which are conventionally used in the manufacture of baking mixes are suitable for use with the emulsifier blends of the present invention. They may be of animal or vegetable origin and may be either in liquid or plastic state. A portion of a component, one or two components or all components of the emulsifier blend may be incorporated into the shortening ingredient, if desired. Certain other ingredients, such as the various gums which are common to dry cake mixes, may also be included in the cake mixes of the present invention.

The cake mixes once prepared are conveniently prepared into cakes by procedures which are well known and commonly practiced. For example, a batter may be formed by mixing the dry mix with water, or other aqueous liquid such as milk, and one or more whole eggs or egg whites. This mixing is usually accomplished over the space of several minutes with a household electric mixer. The resultant batter is then poured into a cake pan and baked in an oven, for example, for 25–40 minutes at 350° F. to 425° F.

The previously indicated limits of components is critical to the performance of the emulsifier blend in cake mixes and, as demonstrated hereinafter in the Examples, certain attributes of the cake are affected as the amounts of each component reach their limit. For example, as the amount of GLE is increased within the blend limits, the moistness increases. However, when the amount of GLE is in excess of the critical limit, the grain is too coarse, and when it is less than the critical limit, the cake is too dry. Similarly, insufficient MONO component results in an unacceptably dry, tough cake, and increasing amounts impart more tenderness, moistness and evenness of grain up to a point outside the critical range where the cake is very tender, but has a texture which is too gummy. Within the critical range, preferred results in terms of overall quality of the resultant cake are obtained when the emulsifier blend comprises about 55–61% PGME, 22–27% MONO and 13–16% GLE.

The level of emulsifier blend in the cake mix will in large part be dependent on desired characteristics of the cake, and the manner in which the cake is prepared. In general, as the level of emulsifier is increased in the cake mix, the baked cake becomes more tender and exhibits a more even grain. In high ratio cake mixes, the moistness also increases with the level of emulsifier blend. Typically, the emulsifier blend will comprise from 2% to 7% of the cake mix. For conventionally prepared and high-ratio cake mixes, emulsifier blend levels of about 3–5% are suitable, with about 4% being preferable. For cake mixes utilizing a spray-dried pre-mix and no shortening, the emulsifier blend should be used at higher levels, for example, about 5–7%, preferably about 6%.

The following examples will now illustrate several aspects of the present invention. It is understood that these examples are merely illustrative and are not intended to limit the invention to the details set forth therein.

EXAMPLE 1

A yellow cake mix utilizing an emulsifier blend of the present invention was prepared from the following ingredients:

| | |
|---|---|
| Flour | 41.8% |
| Sugar | 41.7% |
| Emulsifier blend | 4.0% |
| Leavening agents | 3.4% |
| Corn sugar | 3.0% |
| Shortening | 2.0% |
| Non-fat milk solids | 2.0% |
| Salt | .7% |
| Flavor | .5% |
| Gums | .5% |

The emulsifier blend was prepared by thoroughly mixing together a mixture comprising 43.75% of a food-grade propylene glycol emulsifier comprising about 50–60% propylene glycol monoester and about 10–15% alpha monoglyceride (Durpro 187 from Durkee Foods), 25.0% of another food-grade emulsifier comprising about 34–38% propylene glycol monoester and about 20–22% mono- and diglycerides (EC-25K from Durkee Foods), and a food-grade glyceryl lacto ester emulsifier having a WICLA value of at least 24%, and no more than 7% alpha monoglyceride (Durlac 200 from Durkee Foods). The resultant emulsifier blend comprised about 61% propylene glycol monoester (PGME), 24% alpha monoglyceride (MONO), and 15% glyceryl lacto ester (GLE).

The emulsifier blend and shortening were melted together and held at 135° F., weighed and blended with the sugar at that temperature. The remaining dry ingredients were mixed thoroughly with the emulsifier/-shortening mixture in a ribbon blender and then passed through a high-speed finishing machine to provide a homogeneous, free-flowing cake mix.

A cake batter was prepared from the cake mix by adding two eggs and 1⅓ cups of water to 15 ounces (425 grams) of the dry mix. The mixture was mixed using a standard household mixer operated at low speed for about one minute and then at high speed for about two minutes to form a thick, fluffy, light-colored batter. The batter was subsequently placed in a standard 9"×13" cake pan and baked for about 25–30 minutes at 350° F.

After cooling for 1½ to 2 hours at room temperature, three height measurements were taken along the longitudinal axis of the cake (one at the center and one on each side) while the cake was in the pan. The sum of the three measurements in millimeters was 79 and this value was considered to be a rough approximation of the cake volume. The resultant baked cake had a fine, even grain with the thin, delicate cell walls characteristic of a high quality layer cake, a smooth crust surface free of wrinkles and water rings, and a moist, tender texture with a rapid rate of disappearance in the mouth.

EXAMPLE 2

A series of 20 cake mixes were prepared with essentially the same formulation and procedure as set forth in Example 1 except that prior art emulsifiers and emulsifier combinations which would be expected to provide good emulsification and/or good aerating properties in a dry cake mix were substituted for the emulsifier blend of the present invention.

Following the procedure of Example 1, a batter was prepared from each cake mix, placed in a cake pan and baked into a cake. After cooling, volume measurements were taken and recorded. The cake of Example 1 and the 20 cakes prepared from the above cake mixes were then evaluated and rated by an expert panel of eight people. Each cake was rated by the panel on a scale of 0–60 for 15 important layer cake attributes, and a mean rating calculated for each cake. Table 1 below summarizes the emulsifiers and emulsifier blends used, and mean rating results and volumes obtained for each cake. The 60-point scale for each attribute runs in the direction indicated in the column in Table 1 which deals with that attribute.

TABLE 1

| Test Number | % Cake Emulsifier | % Aerating Emulsifier | % Hybrid Emulsifier | Types of Cake Emulsifier | Type of Aerating Emulsifier | Type of Hybrid Emulsifier | Crust Surface No Wrinkles-Many | Water Ring None-Severe | Grain Appearance Open-Closed | Gum Layer Less-Greater | Grain Appearance Less Even-More Even | Color Dull-Bright | Moistness Dry-Moist | Crumbliness Less-More | Gumminess Less-More | Tenderness Less-More | Flavor Strength Weaker-Stronger | Mouthfeel Less Grainy-More | Overall Quality Worse-Better | Crumb Structure Thick-Thin | Rate of Disappearance Less Rapid-More | Volume |
|---|---|---|---|---|---|---|---|---|---|---|---|---|---|---|---|---|---|---|---|---|---|---|
| 1 | 100 | 0 | 0 | MONO | | | 25.2 | 11.5 | 14.0 | 35.3 | 16.2 | 37.2 | 37.5 | 24.0 | 26.0 | 34.3 | 29.8 | 32.7 | 25.5 | 23.7 | 33.3 | 74.5 |
| 2 | 100 | 0 | 0 | PGME | | | 21.5 | 20.8 | 11.0 | 27.7 | 15.0 | 40.0 | 17.7 | 24.7 | 31.3 | 10.8 | 21.0 | 30.2 | 14.0 | 14.7 | 15.7 | 71.5 |
| 3 | 0 | 0 | 100 | | | LPGME | 22.7 | 20.7 | 20.0 | 30.5 | 17.7 | 35.3 | 20.0 | 26.3 | 30.7 | 17.3 | 27.0 | 30.2 | 17.2 | 19.7 | 19.7 | 72.0 |
| 4 | 0 | 0 | 100 | | | TGME | 52.5 | 45.7 | 1.5 | 44.2 | 1.3 | 38.8 | 25.7 | 12.7 | 42.2 | 9.5 | 28.8 | 30.2 | 3.3 | 2.2 | 9.3 | 66.5 |
| 5 | 50 | 50 | 0 | MONO | PSMS | | 21.5 | 20.8 | 18.5 | 30.8 | 18.3 | 29.2 | 37.3 | 26.3 | 35.8 | 36.5 | 29.7 | 32.0 | 24.2 | 25.3 | 28.8 | 78.0 |
| 6 | 50 | 50 | 0 | MONO | SMS | | 29.0 | 25.3 | 14.8 | 30.2 | 14.2 | 36.3 | 23.7 | 27.2 | 35.5 | 19.8 | 31.5 | 29.5 | 14.8 | 18.8 | 16.3 | 76.0 |
| 7 | 50 | 50 | 0 | PGME | PSMS | | 9.5 | 12.0 | 23.3 | 28.0 | 23.7 | 28.2 | 35.2 | 27.0 | 38.5 | 32.0 | 30.0 | 29.7 | 27.8 | 25.5 | 27.3 | 79.5 |
| 8 | 50 | 50 | 0 | PGME | SMS | | 12.5 | 10.5 | 18.8 | 29.0 | 21.0 | 32.0 | 36.5 | 28.0 | 33.2 | 31.3 | 30.7 | 30.5 | 26.8 | 24.5 | 28.8 | 78.0 |
| 9 | 0 | 50 | 50 | | PSMS | LPGME | 9.8 | 12.0 | 18.8 | 29.0 | 16.3 | 32.3 | 28.7 | 27.2 | 36.5 | 24.7 | 28.5 | 30.7 | 22.3 | 22.0 | 20.3 | 79.0 |
| 10 | 0 | 50 | 50 | | PSMS | TGME | 41.7 | 37.3 | 9.3 | 30.3 | 11.7 | 38.7 | 24.8 | 24.0 | 32.2 | 17.7 | 28.8 | 31.8 | 16.8 | 14.3 | 18.8 | 73.0 |
| 11 | 0 | 50 | 50 | | SMS | LGME | 10.8 | 9.7 | 18.5 | 30.7 | 17.5 | 33.5 | 19.7 | 20.8 | 35.3 | 13.5 | 25.3 | 32.0 | 16.0 | 15.5 | 17.3 | 74.0 |
| 12 | 0 | 50 | 50 | | SMS | TGME | 42.0 | 36.3 | 4.2 | 33.5 | 8.0 | 34.5 | 19.0 | 16.0 | 39.2 | 7.8 | 22.0 | 33.2 | 10.7 | 8.5 | 12.0 | 64.0 |
| 13 | 75 | 25 | 0 | MONO | PSMS | | 21.0 | 16.7 | 18.2 | 36.2 | 14.2 | 31.0 | 33.7 | 23.2 | 35.0 | 27.0 | 31.5 | 30.3 | 23.7 | 23.8 | 24.0 | 74.0 |
| 14 | 75 | 25 | 0 | MONO | SMS | | 8.0 | 7.7 | 24.5 | 32.0 | 24.8 | 30.3 | 31.7 | 26.7 | 33.3 | 26.8 | 29.5 | 29.7 | 28.5 | 25.2 | 26.2 | 75.0 |
| 15 | 75 | 25 | 0 | PGME | PSMS | | 11.0 | 14.5 | 20.3 | 31.0 | 17.3 | 31.5 | 23.2 | 27.2 | 31.8 | 20.0 | 29.0 | 32.3 | 23.0 | 20.2 | 24.5 | 76.0 |
| 16 | 75 | 25 | 0 | PGME | SMS | | 15.7 | 12.3 | 17.7 | 34.7 | 15.8 | 32.0 | 23.2 | 21.7 | 36.2 | 13.0 | 24.7 | 31.3 | 16.5 | 17.5 | 18.3 | 72.0 |
| 17 | 0 | 25 | 75 | | PSMS | LPGME | 9.8 | 12.0 | 21.7 | 30.2 | 23.5 | 30.8 | 28.5 | 25.7 | 32.8 | 23.8 | 27.5 | 30.7 | 25.8 | 23.2 | 24.2 | 78.0 |
| 18 | 0 | 25 | 75 | | SMS | LPGME | 13.3 | 15.3 | 16.3 | 32.7 | 15.2 | 34.5 | 16.5 | 23.5 | 30.8 | 10.8 | 24.3 | 30.8 | 13.3 | 17.8 | 16.8 | 75.0 |
| 19 | 0 | 25 | 75 | | PSMS | TGME | 45.5 | 40.8 | 4.7 | 39.2 | 9.2 | 36.8 | 18.5 | 18.7 | 30.2 | 5.5 | 26.3 | 29.8 | 7.7 | 4.8 | 13.0 | 73.0 |
| 20 | 0 | 25 | 75 | | SMS | TGME | 51.8 | 46.0 | 3.7 | 46.8 | 5.5 | 32.7 | 25.3 | 14.5 | 46.3 | 3.2 | 25.5 | 28.5 | 5.2 | 3.7 | 4.3 | 69.0 |
| Example 1 | | | | | | | 6.7 | 6.7 | 24.8 | 28.5 | 24.5 | 28.2 | 29.7 | 25.8 | 28.8 | 27.2 | 31.8 | 32.2 | 28.3 | 26.0 | 28.5 | 79.0 |

Footnotes for Table 1:
MONO - Mono-diglyceride emulsifier available from Durkee Foods under the designation Dur-Em 104
PGME - Propylene glycol monoester emulsifier available from Durkee Foods under the designation Dur-Pro 107
LPGME - Lactylated propylene glycol monoester emulsifier available from Durkee Foods under the designation Durlac 300
TGME - Triglycerol monoester emulsifier available from Durkee Foods under the designation Santone 3-1-S
PSMS - Polyoxyethylene sorbitan monostearate emulsifier available from Atlas Chemical under the designation Tween-60
SMS - Sorbitan monostearate emulsifier available from Atlas Chemical under the designation Span-60
Cake Emulsifier - An emulsifier commonly used in dry cake mixes
Aerating Emulsifier - An emulsifier adapted to aid in the incorporation of air
Hybrid Emulsifier - An emulsifier with good emulsifying and aerating properties It can be seen from Table 1 that at least 15 of the 20 cakes tested came within 10 points or exceeded the cake of Example 1 in moistness rating, but all of the cakes tested had more wrinkled crust surfaces, exhibited less water holding capability (as evidenced by more severe water rings), had a more open grain structure and thicker crumb structure than the Example 1 cake, and most of the cakes exhibited more graininess, a pronounced gum layer at the top or bottom of the cake, and a more gummy overall texture.

EXAMPLE 3

A high-ratio yellow cake mix was prepared using essentially the same procedure as Example 1 but with the following formulation of ingredients:

| | |
|---|---|
| Sugar | 43.0% |
| Flour | 38.0% |
| Shortening | 9.1% |
| Emulsifier blend | 4.1% |
| Leavening | 1.3% |
| Coloring | 1.2% |
| Dextrose | 1.0% |
| Starch | 0.9% |
| Salt | 0.5% |
| Gums | 0.3% |
| Vanilla | 0.3% |
| Other | 0.3% |

The emulsifier blend was prepared in accordance with the present invention by mixing together 51.6% of a commercial propylene glycol monoester emulsifier (Durpro 187, Durkee Foods), 14% of a commercial monoglyceride emulsifier (Dur-Em 104, Durkee Foods), and 34.4% of a commercial lactylated monoglyceride emulsifier (Durlac 200, Durkee Foods). The resultant emulsifier blend comprised about 58% PGME, 25% MONO and 17% GLE.

A batter was prepared by adding one cup of water, three eggs, and ⅓ cup of vegetable oil to 18.5 ounces (525 grams) of dry mix, and mixing the combination with a household mixer for one minute at slow speed and two minutes at high speed. The resultant batter was placed in a cake pan and baked for about 30 minutes at 350° F.

Two more cakes were prepared using essentially the same procedure and ingredients as the previous cake, but Emulsifier Blends A and B comprising only the PGME and MONO components were substituted for the emulsifier blend of the invention. Emulsifier Blend A was prepared by mixing together 66% Durpro 187 and 34% Dur-Em 104. Emulsifier Blend B was prepared by mixing together 34% Durpro 187 and 66% Dur-Em 107. Emulsifier Blend A, therefore, comprised about 62% PGME component and about 38% MONO component, i.e., quantities which fall within the range in which these components are present in the emulsifier blends of the invention. Emulsifier Blend B comprised about 38% PGME component and about 62% MONO component, i.e., quantities which fall outside the range in which these components are present in the emulsifier blend of the invention.

The cakes prepared from the above mixes were evaluated by a panel of experts for texture and eating quality. There were essentially no differences perceived between the two cakes containing Emulsifier Blends A and B. All cakes had comparable volumes (78–79). Although the cakes having Emulsifier Blends A and B were perceived to be slightly more moist than the cake with the emulsifier blend of the invention, they were judged to have a less tender, more "raw", open texture and significantly lower overall eating quality than the cake employing the blend of the invention.

EXAMPLE 4

A shortening-free yellow cake mix was prepared having the following formulation:

| | |
|---|---|
| Spray-dried premix | 75.0% |
| Sugar | 14.5% |
| Leavening agents | 3.4% |
| Corn sugar | 3.0% |
| Non-fat dry milk solids | 2.0% |
| Salt | 0.7% |
| Flavoring | 0.5% |
| Gums | 0.5% |
| Egg solids | 0.4% |

The premix was prepared by combining flour, sugar, emulsifier, and water in the ratios indicated below, and subsequently spray-drying the mixture in accordance with the procedure detailed in U.S. Pat. No. 3,505,079:

| | |
|---|---|
| Flour | 61.5% |
| Sugar | 30.5% |
| Emulsifier blend | 8.0% |

The emulsifier blend was prepared in accordance with the present invention and comprised the same formulation as the emulsifier blend in Example 1.

The final cake mix was prepared by thoroughly mixing the premix with a base mix comprising the balance of the dry ingredients in a ribbon blender and then passing the combination through a high-speed finishing machine to provide a homogeneous, free-flowing cake mix.

A cake batter was prepared from this final cake mix by adding two whole eggs and 1⅓ cups of water to 15 ounces (425 grams) of the mix. The batter was mixed with a standard household mixer operated at low speed for about one minute and then high speed for about two minutes. The cake batter thus prepared was placed in a standard household cake pan and baked for about 33 minutes at 350° F.

The resultant cake was moist and had a light and tender texture with a fine, uniform grain structure. Volume measurements taken in accordance with the procedure described in Example 1 gave a value of 78.

EXAMPLE 5

Several emulsifier blends within the scope of the invention were prepared from a variety of different commercial emulsifiers, and these emulsifier blends were substituted for the emulsifier blend in the cake mix of Example 4. The components in each emulsifier blend are summarized in Table 2 below.

TABLE 2

| | Amount of Blend Component (Calculated) | | |
|---|---|---|---|
| Emulsifier Blend # | PGME | MONO | GLE |
| 1[(a)] | 65.5% | 22.6% | 13.8% |
| 2[(b)] | 58.5% | 22.0% | 19.5% |
| 3[(c)] | 63.6% | 22.3% | 14.0% |
| 4[(d)] | 57.5% | 23.6% | 19.0% |

TABLE 2-continued

| | Amount of Blend Component (Calculated) | | |
|---|---|---|---|
| Emulsifier Blend # | PGME | MONO | GLE |
| 5[e] | 54.8% | 29.4% | 15.8% |

Footnotes for Table 2 above:
[a]65.0% Durpro 187 (Durkee Foods) - about 55% PGME and 13% MONO
27.5% Durlac 200 (Durkee Foods) - about 27.5% GLE
7.5% Dur-Em 104 (Durkee Foods) - about 42% MONO
[b]53.75% Durpro 187
36.25% Durlac 200
10.00% Dur-Em 104
[c]55% Durpro 187
45% Durlac 107 (Durkee Foods) - about 15% GLE and 8% MONO
[d]45% Durpro 187
55% Durlac 107
[e]53.75% Durpro 187
36.25% Durlac 200
10.00% Myverol 1806 (Eastman Kodak) - about 90% MONO Cakes baked from the above mixes were evaluated by a panel of experts as described in Example 2 for the attributes of water ring, tenderness, moistness, and evenness of grain. The overall quality of the cakes as measured by these attributes was generally comparable to that of the cake of Example 4, but significant differences in the ratings resulted from the variations in the relative amounts of each component in the emulsifier blend. In general, the water-holding cability of the cakes (as evidenced by the presence of a water ring on the crust surface) and the moistness increased as the GLE percentage increased; the moistness and tenderness increased as the PGME percentage increased; and the moistness, evenness of grain and tenderness increased as the MONO percentage increased.

EXAMPLE 6

A series of four cake mixes were prepared employing essentially the same procedure and formulation as set forth in Example 1 except that the components in the emulsifier blend were varied in accordance with Table 3 below:

TABLE 3

| | Amount of Blend Component (By Analysis) | | |
|---|---|---|---|
| Emulsifier Blend # | PGME | MONO | GLE |
| 1[a] | 57% | 27% | 16% |
| 2[b] | 49% | 40% | 11% |
| 3[c] | 52% | 24% | 24% |
| 4[d] | 69% | 21% | 10% |

Footnotes for Table 3 above:
[a]52 % Durpro 107 (PGME derived from vegetable sources)
34% Durlac 200
14% Dur-Em 104
[b]43% Durpro 107
25% Durlac 200
32% Dur-Em 104
[c]43% Durpro 107
45% Durlac 200
9% Dur-Em 104
[d]70% Durpro 107
25% Durlac 200
5% Dur-Em 104

Cakes baked from these cakes mixes were evaluated for water rings, moistness, grain evenness and tenderness. The cake employing the emulsifier blend of the present invention (Blend #1) was judged acceptable for all of the above attributes and had the most even grain of all the cakes tested. The cake employing the emulsifier blend with the amount of MONO component outside the range of the present invention (Blend #2) had an unacceptable water ring and although tender in texture, it was judged to be too gummy. The cake employing the emulsifier blend with the amount of GLE outside the range of the present invention (Blend #3) had an unacceptably coarse grain structure and a slight off flavor. The cake employing the emulsifier blend with the amount of PGME component outside the range of the present invention (Blend #4) was judged to be unacceptable for all of the attributes tested.

What is claimed is:

1. A blend of commercial food grade emulsifiers suitable for use in a dry prepared mix, said blend comprising an admixture of three separate functional emulsifying components consisting essentially of 45–68% propylene glycol monoester, 20–39% alpha monoglyceride and 9–22% glyceryl lacto ester.

2. An emulsifier blend according to claim 1 wherein the propylene glycol monoester is derived from a commercial food-grade emulsifier comprising from 30 to 60% propylene glycol monoester.

3. An emulsifier blend according to claim 2 wherein said commercial emulsifier also includes alpha monoglyceride.

4. An emulsifier blend according to claim 1 wherein at least a portion of the alpha monoglyceride is derived from a commercial food-grade mono-diglyceride emulsifier comprising at least 40% alpha monoglyceride.

5. An emulsifier blend according to claim 1 wherein the glyceryl lacto ester is derived from a commercial food-grade glyceryl lacto ester emulsifier having at least 24% water-insoluble combined lactic acid, and a saponification number of 290–305.

6. An emulsifier blend according to claim 1 having a saponification number of 205 to 225.

7. An emulsifier blend according to claim 1 comprising 53–61% propylene glycol monoester, 22–27% alpha monoglyceride and 13–16% glyceryl lacto ester.

8. A dry prepared cake mix for layer cakes wherein the emulsifier blend of claim 1 comprises 2–7% of the dry cake mix ingredients.

9. A dry prepared cake mix comprising a pre-mix portion of flour, sugar, and the emulsifier blend of claim 1, and a base mix portion comprising the balance of the dry cake mix ingredients, said emulsifier blend comprising from 2–7% of the dry cake mix ingredients.

10. A cake mix according to claim 9 wherein said pre-mix is spray-dried, and said emulsifier blend comprises 5–7% of the dry cake mix ingredients.

11. A cake mix according to claim 10 without shortening.

12. A cake mix according to claim 9 wherein said emulsifier blend comprises 6% of the dry cake mix ingredients.

13. A process of preparing an emulsifier blend for use in a dray prepared mix, which process comprises mixing together commercial food grade emulsifier comprising propylene glycol monoester, alpha monoglyceride and glyceryl lacto ester in quantities sufficient to provide a blend wherein the functional emulsifying components consist essentially of 45–68% propylene glycol monoester, 20–39% alpha monoglyceride and 9–22% glyceryl lacto ester.

* * * * *